US006574173B1

(12) United States Patent
Manes

(10) Patent No.: US 6,574,173 B1
(45) Date of Patent: Jun. 3, 2003

(54) TOTAL AXIS, SELF ADJUSTING PASS-THROUGH PORT

(75) Inventor: Joseph Paul Manes, Arvada, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/493,315

(22) Filed: Jan. 28, 2000

(51) Int. Cl.[7] ............................................... G11B 21/08
(52) U.S. Cl. .................................................. 369/30.48
(58) Field of Search ........................... 369/30.39, 30.48, 369/30.49; 360/92

(56) References Cited

U.S. PATENT DOCUMENTS

| | | | | |
|---|---|---|---|---|
| 5,429,470 A | * | 7/1995 | Nicol et al. | 360/92 |
| 5,548,521 A | | 8/1996 | Krayer et al. | 364/478.02 |
| 5,663,938 A | * | 9/1997 | Dang et al. | 360/92 |
| 6,011,669 A | | 1/2000 | Apple et al. | 360/92 |
| 6,064,544 A | * | 5/2000 | Wada | 360/92 |

FOREIGN PATENT DOCUMENTS

EP           0 276 967         8/1988

* cited by examiner

*Primary Examiner*—David Davis
(74) *Attorney, Agent, or Firm*—Brooks & Kushman P.C.

(57) ABSTRACT

A total axis, self adjusting pass-through port for use with library storage modules (LSM) of different heights and placed at different angles and distances. The pass-through port may include one or more hinged library storage module terminal ports, telescopic guide rails, and one or more ball joints associated with the guide rails to facilitate the transport of storage medium from a sending LSM to a receiving LSM when the sending and receiving LSM are placed at non-standard angles, have different radii of curvature, different heights, or are placed at non-standard distances from one another.

36 Claims, 6 Drawing Sheets

90°
ARRAY FLIP

TOTAL AXIS, SELF ADJUSTING PASS-THROUGH PORT

BACKGROUND OF THE INVENTION

1. Technical Field

The present invention is directed to a total axis, self adjusting pass-through port. Specifically, the present invention is directed to a pass-through port for use with library storage modules that facilitates various angles between the library storage modules, varying distances between the library storage modules, and varying heights of the library storage modules.

2. Description of Related Art

The use of library storage modules is generally known in the art. Library storage modules allow for the storage and retrieval of thousands of magnetic tape cartridges for use with computing systems. A typical library storage module is described, for example, in U.S. Pat. No. 4,864,511 issued to Moy et al., which is hereby incorporated by reference in its entirety.

It is also known to use pass-through ports to facilitate the passing of magnetic tape cartridges from one library storage module to another. FIG. 1 is a diagram illustrating the prior art pass-through port. As shown in FIG. 1, the pass-through port is comprised of multiple storage cells 132 adapted to ride upon a carriage 384 for transference between the library storage modules. The array of storage cells 132 are spring-loaded upon a pivot 386 attached to the carriage 384, and includes a pair of cam followers 388 adapted to follow a cam surface 390 from one library storage module to the other. The carriage 384 is further coupled to a lead screw 392 by a nut (not shown), which pulls the carriage 384 along the lead screw 392. In order to guide the carriage 384 along the lead screw 392, the carriage 384 is further coupled to a pair of guide rods 396.

When a drive motor 398 rotates the lead screw 392, the carriage 384 is pulled along the lead screw 392 by the nut 394, but the pivoting array of cells 132 following the cam surface 390 enable the cells 132 to be positioned advantageously for incorporation with either library storage module. That is, the array of cells 132 is initially positioned within one library storage module in a manner similar to each of the other storage cells 132 mounted upon the outer housing of the library storage module for access by a robotic arm. Thereafter, upon rotation of the lead screw 392 by the motor 398, the array of cells 132 are rotated, as shown by the dashed arrows in FIG. 1, to a position within the interconnected library storage module for access by its respective robotic arm. The carriage 384 does not enter the arm swing space so that motions of the robotic arm may continue during rotation.

FIGS. 2 and 3 show another prior art pass-through port in which, instead of guide rods 396, the carriage 384a is guided by a simple groove 395 and pin 397 arrangement which maintains its stability. Like the pass-through port 382 shown in FIG. 1, the pass through port 382a includes a pair of cam surfaces 390a and 390b each of which are referenced to their respective library storage modules. A lead screw 392a and nut 394a arrangement provides the motive force for translating the carriage 384a between the library storage modules. A torsion spring 384 is used to pivot the cells 132 just as in the pass-through port 382 of FIG. 1.

These prior art pass-through ports are limited, however, to a specific angle between library storage modules, a specific distance between library storage modules, and library storage modules that are of the same height. As a consequence, the prior art pass-through ports are very difficult to align due to variations in all directions from one library storage module to another. Thus, there is a need for new technology to allow a library storage module to pass tape cartridges from itself to other dissimilar library storage modules or library modules placed in different positions.

SUMMARY OF THE INVENTION

The total axis, self adjusting pass-through port according to this invention includes a tape carrier attached to a carriage for movement between two library storage modules (LSMs). The carriage is further coupled to a drive belt and guide rail assembly. The drive belt moves the carriage from one LSM terminal port, associated with a sending LSM, to another, associated with a receiving LSM, when driven by the drive motor. The guide rail assembly guides the carriage along the path between LSM terminal ports. One or both of the LSM terminal ports may be hinged to the guide rail assembly to facilitate varying angles between the LSMs.

The LSM terminal ports are two separate devices that may be mounted on respective LSMs and may be mounted in various positions relative to one another. Thus, the use of the two separate LSM terminal ports helps to facilitate the placement of LSMs in various positions relative to one another and also helps to facilitate the use of LSMs having different radii.

The tape carrier includes a cam follower which follows cam surfaces in the LSM terminal ports as the tape carrier is moved from one LSM terminal port to the other LSM terminal port, and vice versa. The cam follower engaging the cam surfaces provides a mechanism by which the tape carrier is rotated about a pivot such that the tape carrier may be rotated into a position relative to the LSMs that allows an associated robotic arm to retrieve tape cartridges present in the tape carrier.

The guide rail assembly may be comprised of telescopic guide rails having a master guide rail and a slave guide rail which is configured such that it may slide in and out of the master guide rail to thereby provide a telescopic motion of the guide rails. The use of telescopic guide rails in the guide rail assembly allows for varying distances between the LSM terminal ports, and hence varying distances between the LSMs. The varying distances may be a-result of varying angles between the LSMs, varying heights between the LSMs, placement of the LSMs and the like.

As a further feature, the guide rail assembly may include a ball joint for attachment of the guide rail assembly to one or more of the LSM terminal ports. The ball joint provides for three degrees of rotation about an attachment point. Thus, by using the ball joint, the LSM terminal ports may be positioned in varying positions relative to one another. The combination of the ball joint, telescoping guide rails, and the hinged LSM terminal port provides for a tape cartridge pass-through port that is capable of facilitating varying heights, angles, and distances between LSMs.

In addition, the LSM terminal ports may include orientation devices which help to orient the tape carrier so that the tape carrier is in a proper position when engaged with the LSM terminal port. When the orientation devices contact an orientation device engagement device on the tape carrier, the engagement between the two devices causes the tape carrier to orient to a position from which a robotic arm associated with the receiving LSM may retrieve tape cartridges.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein like numerals identify like elements, and wherein:

DETAILED DESCRIPTION OF THE PREFERRED EMBODIMENT

Figure 4:
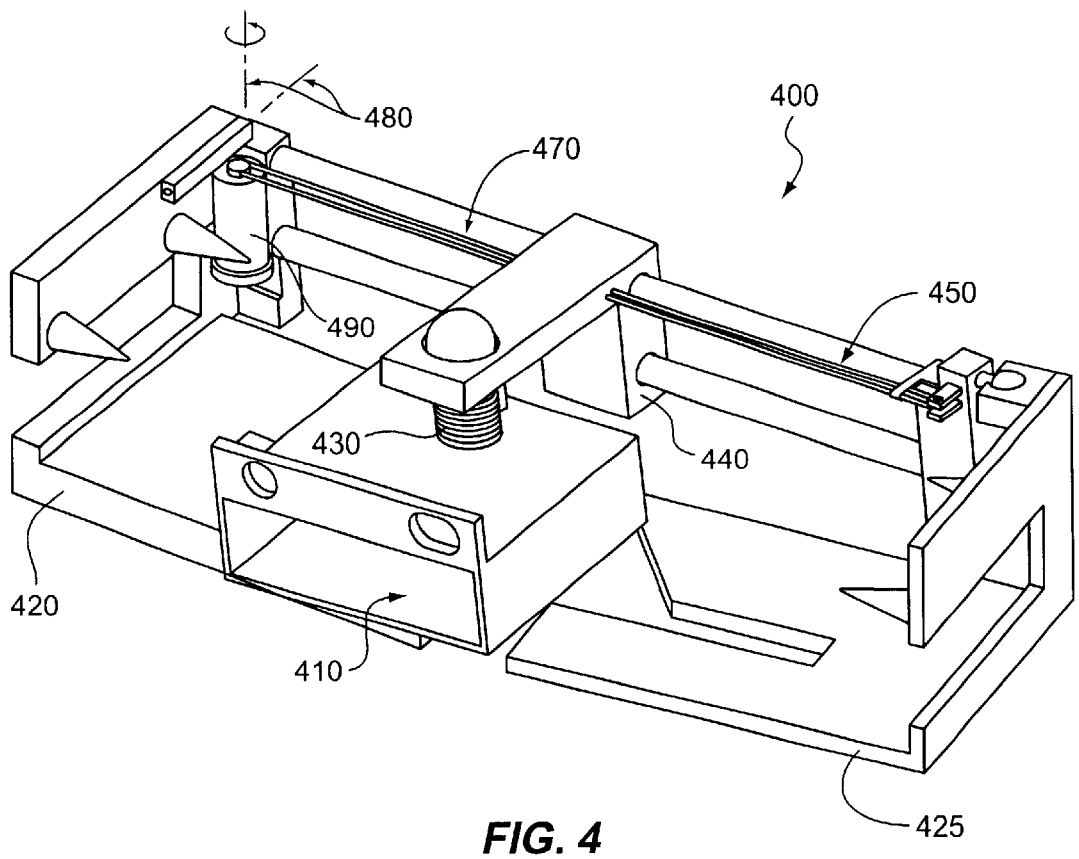
FIG. 4 is a diagram of the pass-through port device according to one embodiment of the present invention.

FIG. 4 is a diagram of the pass-through port device 400 according to one embodiment of the present invention. As shown in FIG. 4, the pass-through port device 400 includes a tape carrier 410 attached to a carriage 440 for movement between two library storage modules (LSMs). The tape carrier 410 is spring-loaded upon a pivot 430 attached to the carriage 440.

The carriage 440 is further coupled to a drive belt 470 and guide rail assembly 450. The drive belt 470 moves the carriage from one LSM terminal port 420 to another when driven by the drive motor 490. The guide rail assembly 450 guides the carriage 440 along the path between LSM terminal ports 420 and 425.

The LSM terminal ports 420 and 425 are two separate devices that may be mounted on respective LSMs and may be mounted in various positions relative to one another. Thus, the use of the two separate LSM terminal ports 420 and 425 helps to facilitate the placement of LSMs in various positions relative to one another and also helps to facilitate the use of LSMs having different radii.

Figure 1:
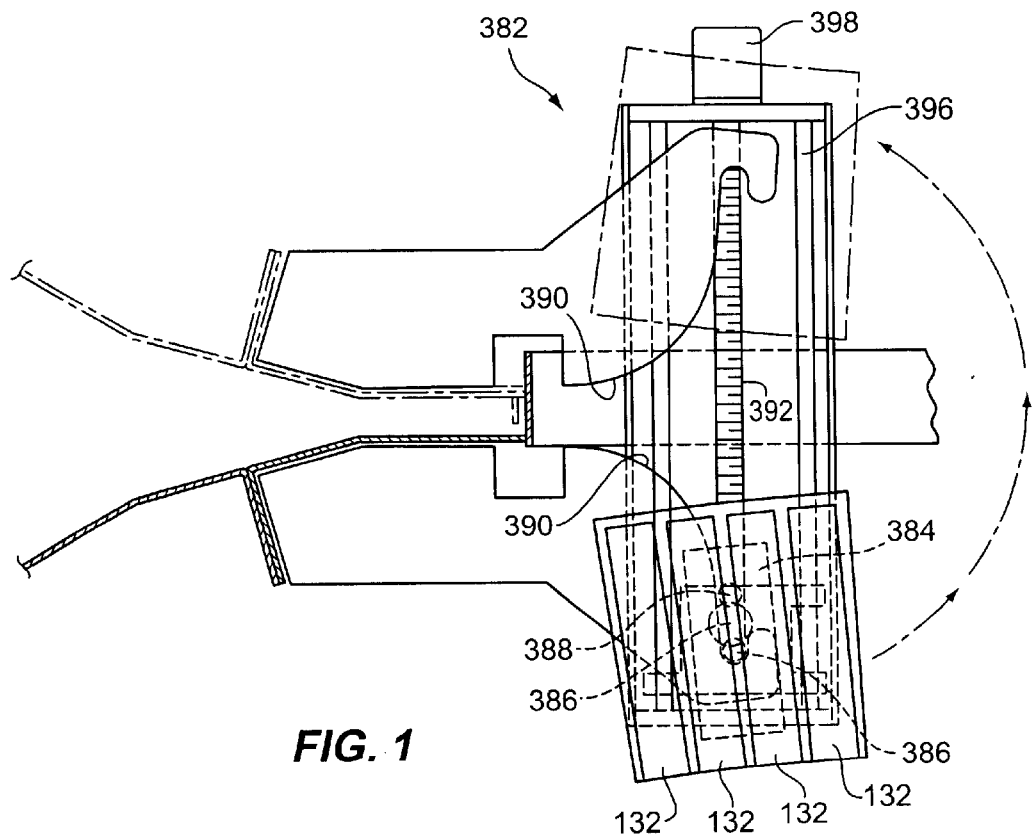
FIG. 1 is a diagram of a prior art pass-through device.
Figure 2:
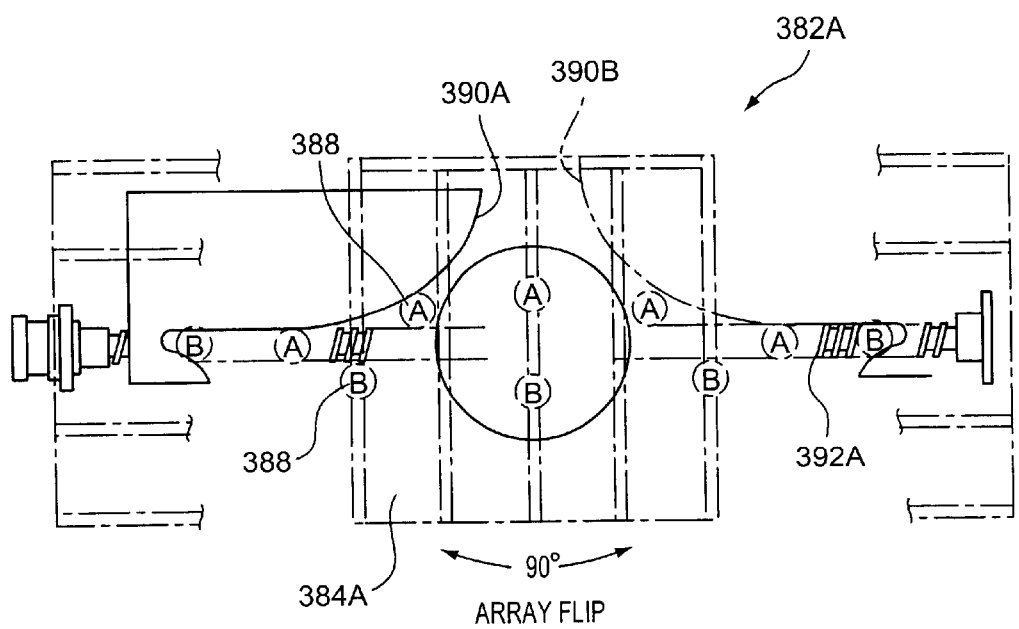
FIGS. 2 and 3 are diagrams of another prior art pass-through device.
Figure 3:
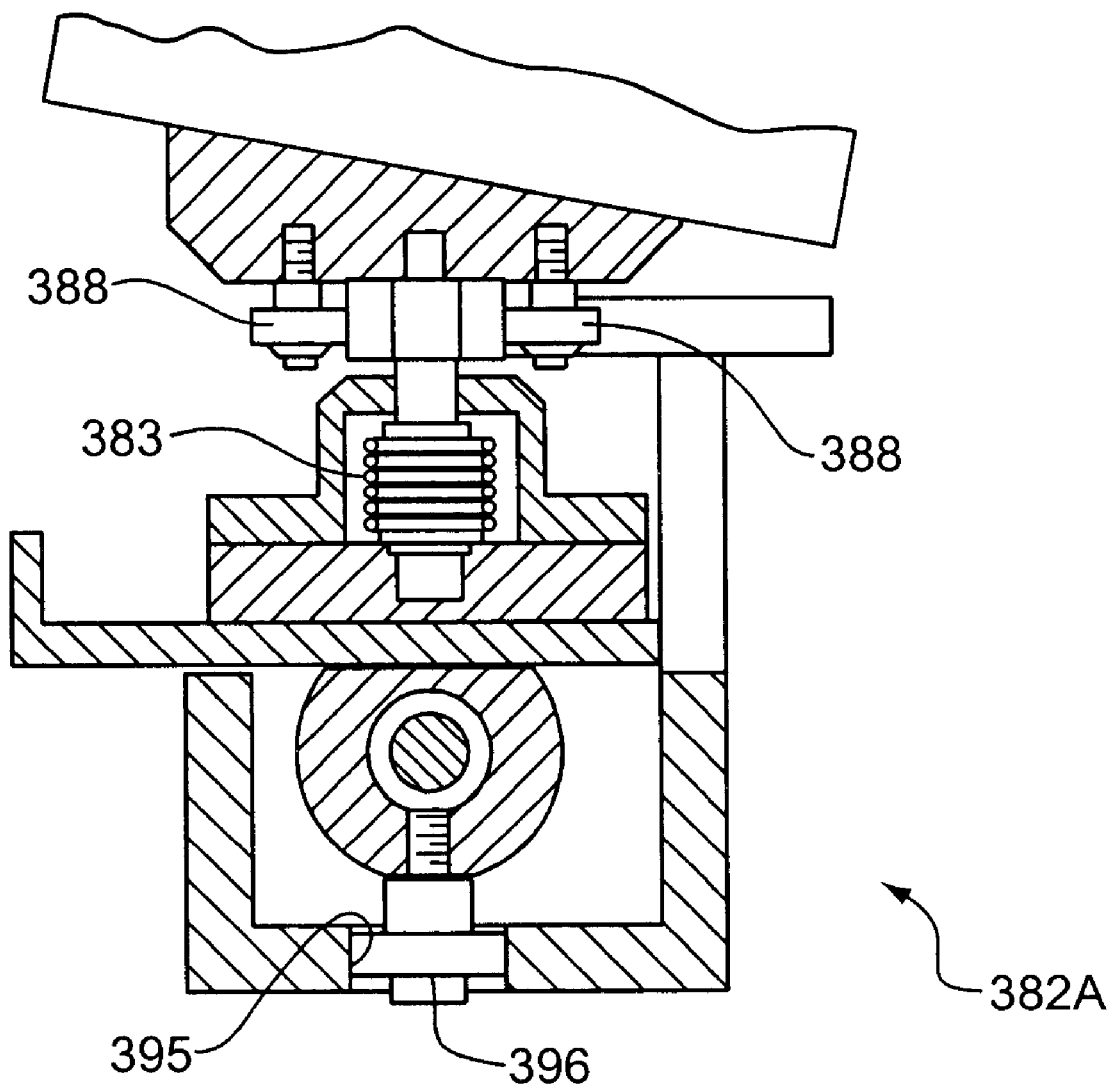

Although FIG. 4 shows the pass-through port device 400 as having a drive belt 470 to move the carriage 440 from one LSM terminal port 420 to the other LSM terminal port 425, the invention is not limited to such an embodiment. Rather, as described in the incorporated U.S. Pat. No. 4,864,511 and shown in FIGS. 1 and 2, a nut and screw assembly may be utilized for moving the tape carrier 410 between LSM terminal ports 420 and 425. Other equivalent driving mechanisms may be employed to drive the taped carrier 410 between LSM terminal ports 420 and 425 without departing from the spirit and scope of the invention.

The LSM terminal port 420 is hinged about the hinge axis 480 such that the LSM terminal port 420 may rotate about the vertical axis in a horizontal motion. This hinge allows the LSM terminal port 420 to be placed in various angles relative to LSM terminal port 425. The LSM terminal ports 420 and 425 are mountable on a LSM such that LSM terminal port 420 may be associated with a first LSM and LSM terminal port 425 is associated with a second LSM.

Although the preferred embodiment shown in FIG. 4 utilizes one hinged LSM terminal port 420 and one non-hinged LSM terminal port 425, the invention is not limited to such an embodiment. To the contrary, both the LSM terminal ports 420 and 425 may be hinged or non-hinged.

Figure 5:
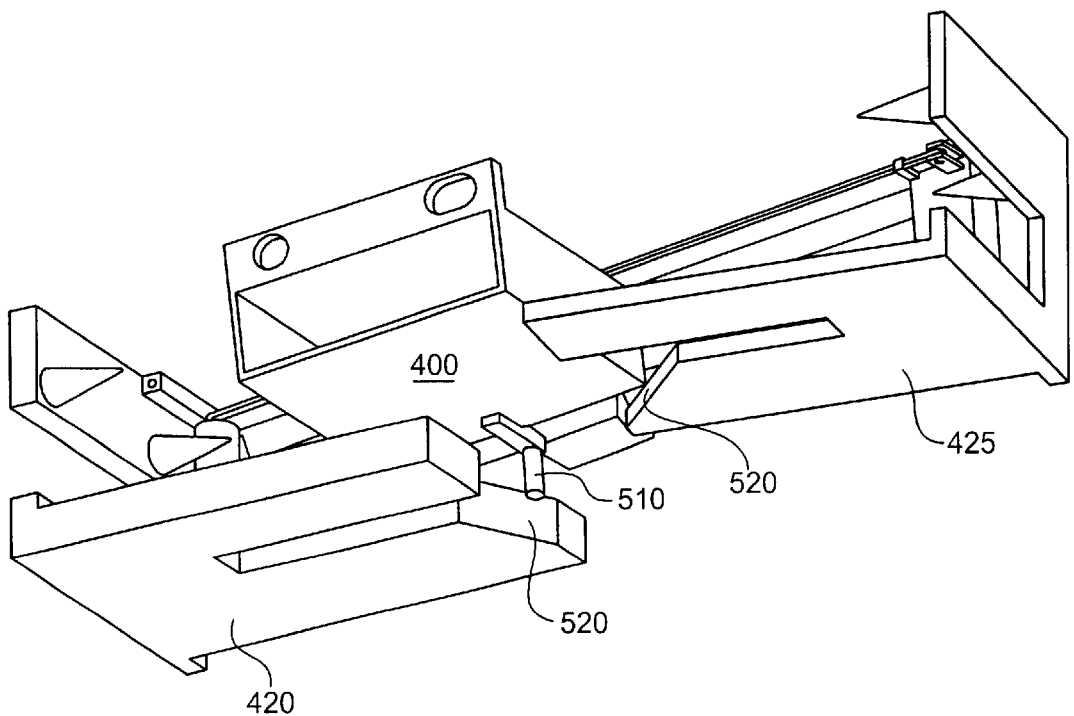
FIG. 5 is a diagram of the pass-through port device of FIG. 4 from an angle slightly below the pass-through port device.

FIG. 5 shows the pass-through port device 400 from a view point slightly below the pass through port device 400. As shown in FIG. 5, the tape carrier 410 includes at least one cam follower 510 on the bottom surface of the tape carrier 410. The cam follower follows the cam surfaces 520 as the tape carrier 410 is moved from one LSM terminal port 420 to the other LSM terminal port 425, and vice versa, by the carriage 440 being driven by the drive motor 490 and the drive belt 470. Although only one cam follower 510 is shown in FIG. 5, a plurality of cam followers 510 may be used without departing from the spirit and scope of the invention.

The cam follower 510 engaging the cam surfaces 520 provides a mechanism by which the tape carrier 410 is rotated about the pivot 430. In this way, the tape carrier 410 may be rotated into a position relative to the LSMs that allow an associated robotic arm to retrieve tape cartridges present in the tape carrier 410.

In order to ensure that the cam follower 510 engages the cam surfaces 520 as the tape carrier 410 moves between LSM terminal ports 420 and 425, the preferred embodiment shown in FIGS. 4 and 5 makes use of one hinged and one non-hinged LSM terminal port 420, 425. To further ensure proper positioning of the tape carrier 410 as it travels between LSM terminal ports 420 and 425, hinge restriction devices may be employed to limit the angle at which the LSM terminal ports 420 and 425 may be placed relative to one another. Additionally, the LSM terminal ports 420 and 425 may be configured in such a way that a large range of angles between the LSM terminal ports 420 and 425 are accommodated.

While the embodiment shown in FIG. 5 depicts the cam follower 510 as being on a bottom surface of the tape carrier 410, the invention is not limited to such an arrangement. Rather, the cam follower 510 may be placed on any surface of the tape carrier 410 as long as the cam follower is able to follow a cam surface 520 for rotation of the tape carrier 410. Thus, for example, if a cam surface 520 is mounted above the tape carrier 410, the cam follower 510 may be positioned on a top surface of the tape carrier 410.

The drive motor 490 drives the drive belt 470 based on control signals sent to the drive motor 490. These signals may be sent, for example, by a computer associated with an LSM (either the sending or receiving LSM), a switch operated by an operator or a robotic arm, or the like. Any means by which a control signal may be sent to the drive motor 490 is intended to be within the spirit and scope of the present invention.

When the drive motor 490 drives the drive belt 470, the carriage 440 is pulled along the guide rail assembly 450 between the LSM terminal ports 420. As the carriage 440 moves from one LSM terminal port 420 to the other 425, for example, the cam follower 510 mounted on the tape carrier 410 follows the cam surfaces 520 in the LSM terminal ports 420 and 425. In this way, the cam follower 510 causes the tape carrier 410 to rotate from a first position in which an opening in the tape carrier 410 is aligned with the first LSM, to a position in which the opening in the tape carrier 410 is aligned with the second LSM.

Thus, with the present invention as shown in FIGS. 4 and 5, when a tape cartridge is to be transported from one LSM to another, the robotic arm associated with the sending LSM loads the tape cartridge into the tape carrier 410. A control signal is sent to the drive motor 490 which pulls the carriage 440 using the drive belt 470. As the tape carrier 410 traverses the path between LSM terminal ports 420 and 425, the cam follower 510 moves along the cam surfaces 520.

While the cam follower 510 moves along the cam surfaces 520, the tape carrier 410 is caused to rotate about the pivot 430. As a result, the tape carrier 410 is placed in a proper position relative to the receiving LSM such that a robotic arm associated with the receiving LSM is able to remove the tape cartridge from the tape carrier 410.

Figure 6:
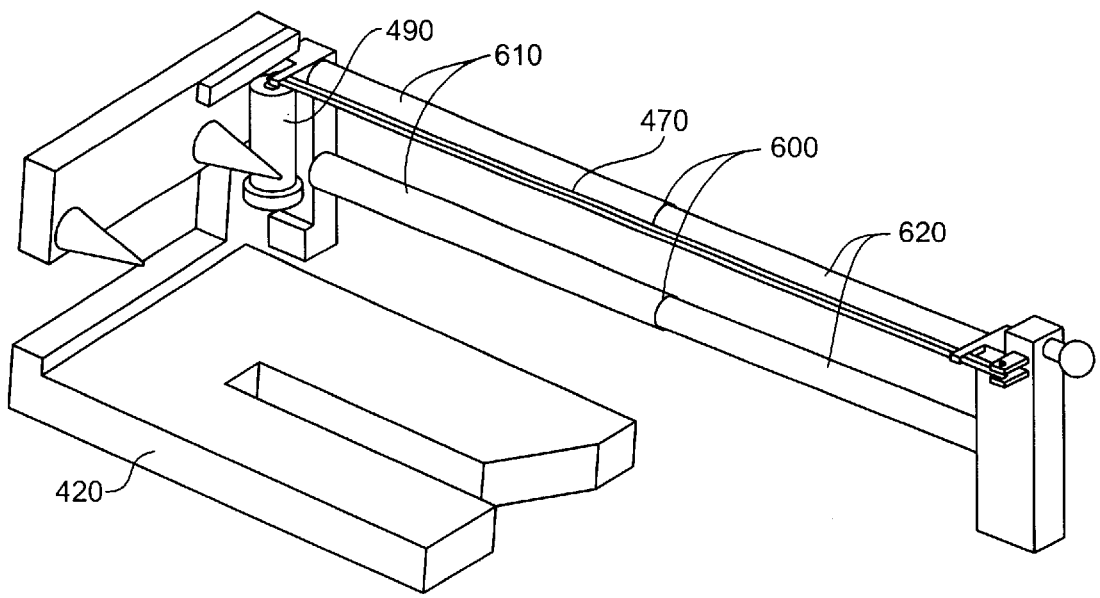
FIG. 6 is a diagram illustrating the telescoping guide rails of one embodiment of the invention.

FIG. 6 is a diagram illustrating features of a further embodiment of the invention. As shown in FIG. 6, the guide rail assembly 450 may be comprised of telescopic guide rails 600 having a master guide rail 610 and a slave guide rail 620. The slave guide rail 620 is configured such that it may slide in and out of the master guide rail 610 to thereby provide a telescopic motion of the guide rails 600.

The use of telescopic guide rails 600 in the guide rail assembly 450 allows for varying distances between the LSM terminal ports 420 and 425, and hence varying distances between the LSMs. The varying distances may be a result of varying angles between the LSMs, varying heights between the LSMs, placement of the LSMs and the like.

As a further feature, the guide rail assembly 450 may include a ball joint 630 for attachment of the guide rail assembly 450 to one of the LSM terminal ports 425, for example. The ball joint 630 provides for free motion about three axes of an attachment point. Thus, by using the ball joint 630, the LSM terminal ports 420 and 425 may be positioned in varying positions relative to one another. The combination of the ball joint 630, telescoping guide rails 600, and the hinged LSM terminal port 420 provides for a tape cartridge pass-through port 400 that is capable of facilitating varying heights, angles, and distances between LSMs.

Figure 7:
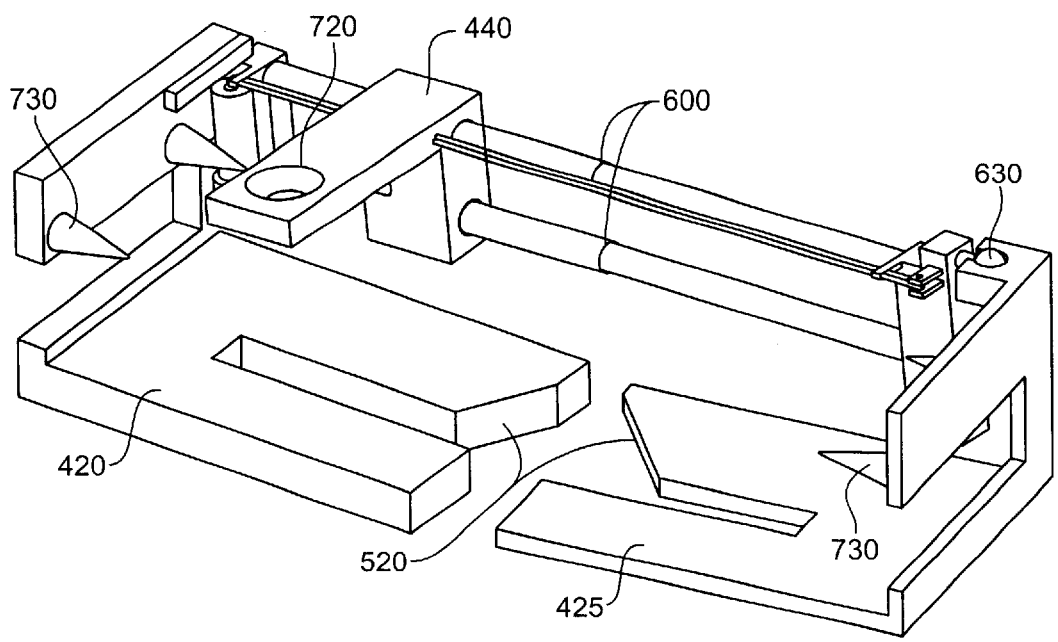
FIG. 7 is a diagram illustrating additional features of the pass-through port device according to the invention.

FIG. 7 is a diagram of the guide rail assembly 450 shown in FIG. 6 in conjunction with the carriage 440 and the LSM terminal port 425. As shown in FIG. 7, the carriage 440 is capable of movement along the telescoping guide rails 600 while the ball joint 630 provides a mechanism by which the LSM terminal port 425 may be positioned at an angle relative to the LSM terminal port 420.

Additional features of the invention shown in FIG. 7 include the opening 720 which is configured to receive the pivot 430, and orientation devices 730 which help to orient the tape carrier 410 so that the tape carrier 410 is in a proper position when engaged with the LSM terminal port 420 or 425. Although the opening 720 is shown as being circular, any type of opening may be used without departing from the spirit and scope of the invention. While the orientation devices 730 are shown as being tapering in shape, the invention may make use of orientation devices 730 having any suitable shape for orienting the tape carrier 410.

Figure 8A:
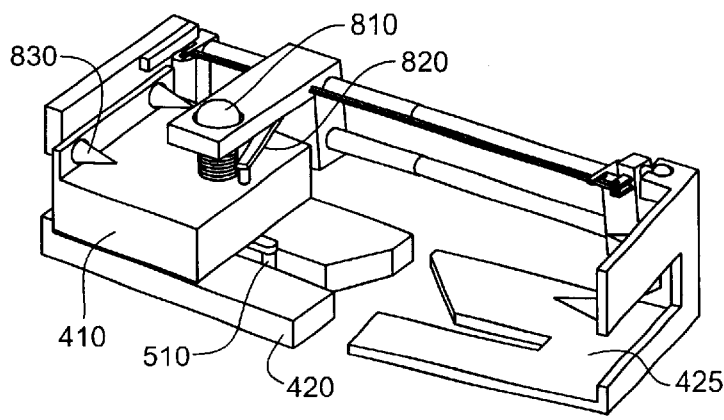
FIGS. 8A–D illustrate the movement of the tape cartridge holder as it moves from one library storage module to another library storage module.

FIGS. 8A–D depict the tape carrier 410 at various stages during the transport of a tape cartridge from LSM terminal port 420 to LSM terminal port 425. As shown in FIG. 8A, the tape carrier 410 may be attached to the carriage 440 by way of a free ball joint 810. The tape carrier 410 may further include a bias spring 820 for returning the tape carrier 410 to a predetermine position, and an orientation device engagement device 830 for engaging the orientation devices 730. Although a free ball joint 810 is shown in FIGS. 8A–D, the invention may make use of any securing device for securing the tape carrier 410 to the carriage 440 so long as the securing device allows for rotation of the tape carrier 410.

Figure 8B:
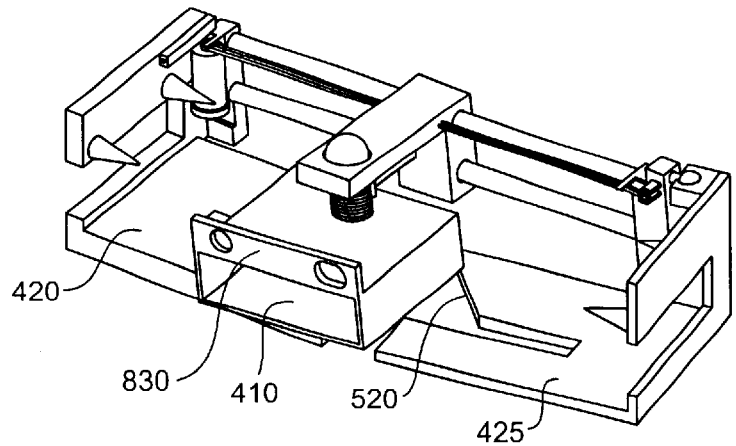
Figure 8C:
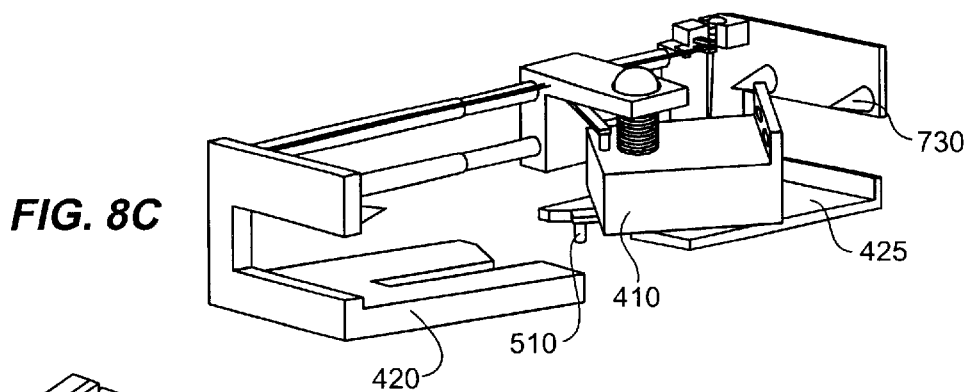
Figure 8D:
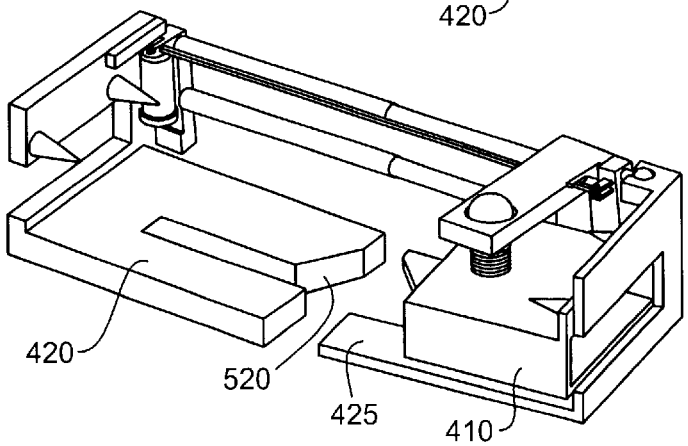

As shown in FIG. 8A, the tape carrier 410 starts in an engaged position with a first LSM associated with LSM terminal port 420. As the tape carrier 410 moves from the LSM terminal port 420 to the LSM terminal port 425, the tape carrier 410 is rotated about the pivot 430 by way of the free ball joint 810 and the cam follower 510 following the cam surfaces 520 (FIGS. 8B and 8C). As the tape carrier 410 engages the LSM terminal port 425, the tape carrier 410 is rotated by way of the cam follower 510, cam surface 520, and the engagement of the orientation devices 730 with the orientation device engagement device 830, so that the tape carrier 410 is in a proper position relative to the receiving LSM, for tape cartridge removal by an associated robotic arm (FIG. 8D).

Figure 9:
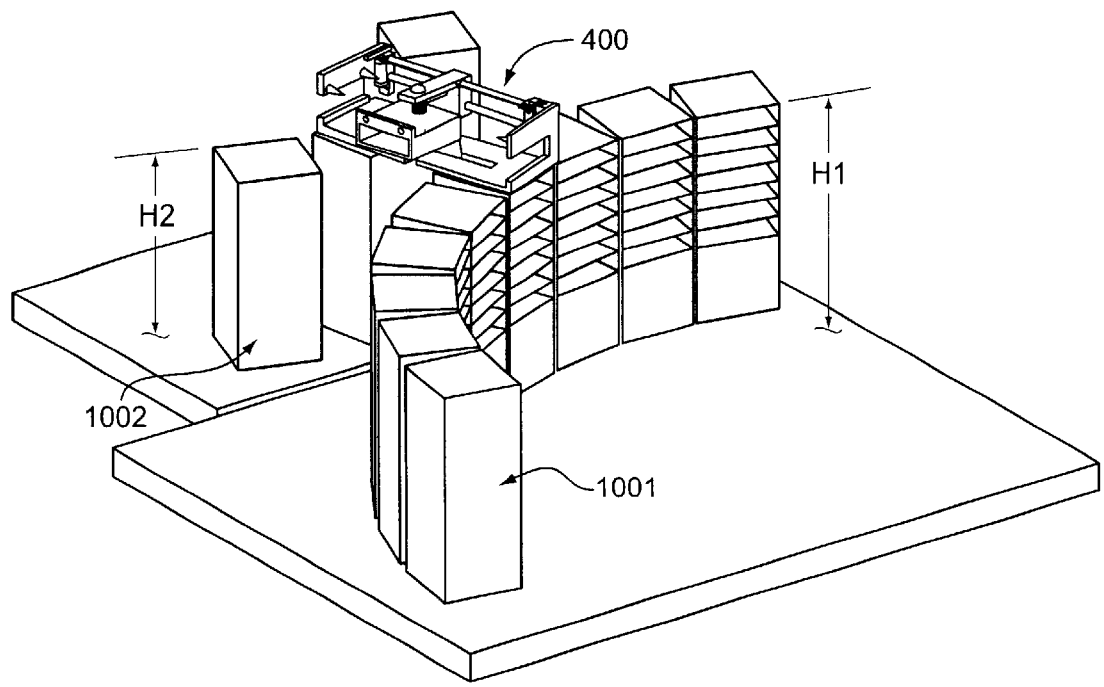
FIG. 9 illustrates how the pass-through port device of the present invention may be utilized with libraries of different heights.

FIG. 9 illustrates how the pass-through port device 400 of the present invention may be used with LSMs having varying heights. As shown in FIG. 9, the pass-through port device 400 is positioned on a top surface of two LSMs 1001 and 1002. LSM 1001 has a height H1 and LSM 1002 has a height H2 with H1 being greater than H2. Thus, as shown in FIG. 9, the pass-through port device 400 of the present invention may be used to transport tape cartridges to and from LSMs having varying heights.

Figure 10:
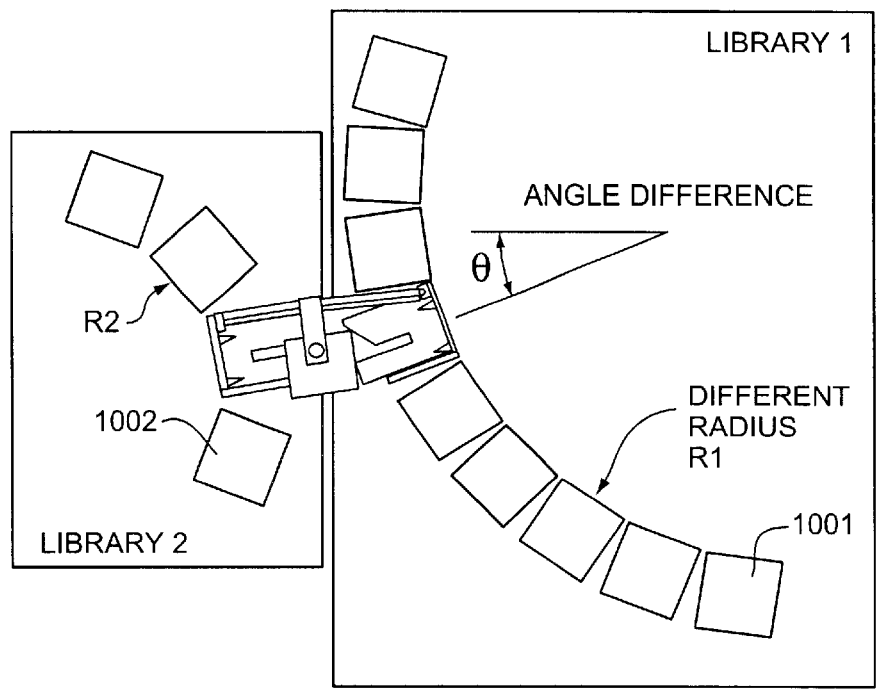
FIG. 10 illustrates how the pass-through port device of the present invention may be utilized with library storage modules positioned at different angles and library storage modules having different radii.

FIG. 10 illustrates how the pass-through port device 400 of the present invention may be used with LSMs positioned at various angles. As shown in FIG. 10, LSM 1001 has a radius $R_1$ and LSM 1002 has a radius $R_2$ which is smaller than radius $R_1$. As a result, LSM 1002 is positioned at an angle difference θ from LSM 1001. However, due to the novel features of the present invention, the pass-through port device 400 is capable of accommodating the angle difference θ in position between the LSMs 1001 and 1002 as shown in FIG. 10.

While the above embodiments are described with reference to a tape cartridge pass-through port apparatus, the invention is not limited to tape cartridges. Rather, any type of storage medium may be transported using the present invention. For example, the storage medium may be digital versatile disks, floppy disks, magnetic tape reels, ROM or RAM cartridges, ZIP disks, removable hard drives, and the like.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A pass-through port apparatus for passing storage medium from a first library storage module to a second library storage module, comprising:

a first library storage module terminal port;

a second library storage module terminal port;

a guide rail assembly; and a storage medium carrier capable of moving from the first library storage module terminal port to the second library storage module terminal port along the guide rail assembly, wherein the first library storage module terminal port and the second library storage module terminal port are movably coupled to the guide rail assembly such that the first library storage module terminal port and the second library storage module terminal port, while remaining coupled to the guide rail assembly, are capable of at least one of the following: being positioned at an angle to one another, being positioned at different heights relative to one another, and being positioned at different distances from one another.

2. The pass-through port apparatus of claim 1, further comprising:
a carriage coupled to the storage medium carrier and to a drive belt, wherein the carriage moves along the guide rail assembly when driven by the drive belt.

3. The pass-through port apparatus of claim 1, further comprising at least one cam follower coupled to the storage medium carrier.

4. The pass-through port apparatus of claim 3, wherein the first library storage module terminal port and the second library storage module terminal port have cam surfaces which are followed by the at least one cam follower as the storage medium carrier moves from the first library storage module terminal port to the second library storage module terminal port.

5. The pass-through port apparatus of claim 4, wherein the cam surfaces are shaped such that the storage medium carrier rotates from a first position to a second position as the storage medium carrier moves from the first library storage module terminal port to the second library storage module terminal port.

6. The pass-through port apparatus of claim 5, wherein the first position is a position in which an opening in the storage medium carrier is accessible by a robotic device associated with the first library storage module and the second position is a position in which the opening in the storage medium carrier is accessible by a robotic device associated with the second library storage module.

7. The pass-through port apparatus of claim 1, wherein the guide rail assembly includes at least one telescopic guide rail.

8. The pass-through port apparatus of claim 1, wherein the guide rail assembly includes at least one master guide rail and at least one slave guide rail, wherein the slave guide rail is capable of sliding within the master guide rail.

9. The pass-through port apparatus of claim 1, wherein the guide rail assembly is coupled to the first library storage module terminal port by a hinged coupling and is coupled to the second library storage module terminal port by a ball joint coupling.

10. The pass-through port apparatus of claim 1, wherein the guide rail assemnbly is coupled to at least one of the first library storage module terminal port and the second library storage module terminal port by a hinged coupling.

11. The pass-through port apparatus of claim 1, wherein the guide rail assembly is coupled to at least one of the first library storage module terminal port and the second library storage module terminal port by a ball joint coupling.

12. The pass-through port apparatus of claim 1, wherein at least one of the first library storage module terminal port and the second library storage module terminal port has at least one orientation device for orienting the storage medium carrier when the storage medium carrier engages the at least one orientation device.

13. The pass-through port apparatus of claim 12, wherein the at least one orientation device has a tapering shape.

14. The pass-through port apparatus of claim 12, wherein the at least one orientation device is conical in shape.

15. The pass-through port apparatus of claim 12, wherein the storage medium carrier has at least one orientation device engagement device for engaging the at least one orientation device.

16. The pass-through port apparatus of claim 1, wherein the first library storage module terminal port and the second library storage module terminal port are capable of being positioned at an angle to one another.

17. The pass-though port apparatus of claim 1, wherein the first library storage module terminal port and the second library storage module terminal port are capable of being positioned at different heights relative to one another.

18. The pass-through port apparatus of claim 1, wherein the first library storage module terminal port and the second library storage module terminal port are capable of being positioned at different distances from one another.

19. The pass-through port apparatus of claim 1, wherein the first library storage module terminal port is mounted to the first storage module and the second library storage module terminal is mounted to the second library storage module, and wherein the first library storage module has a different radius than the second library storage module.

20. The pass-through port apparatus of claim 1, wherein the storage medium carrier is coupled to the carriage by a free ball joint and wherein the storage medium carrier includes a bias spring.

21. An apparatus for transporting a tape cartridge from a first device to a second device, comprising:
a moving means for moving the tape cartridge from the first device to the second device;
a guidance means for guiding the moving means while the moving means is moving from the first device to the second device;
a first coupling means for coupling the guidance means to the first device; and
a second coupling means for coupling the guidance means to the second device, wherein the first and second coupling means are movable such that the first device and second device are capable of being positioned at various positions to one another including at least one of the following:
being positioned at an angle to one another, being positioned at different heights relative to one another, and being positioned at different distances from one another, and
wherein the moving means is capable of moving the tape cartridge from the first device to the second device in any one of the various positions.

22. The apparatus of claim 21, further comprising:
a drive means coupled to the moving means, wherein the moving means moves along the guidance means when driven by the drive means.

23. The apparatus of claim 21, further comprising at least one cam following means coupled to the moving means.

24. The apparatus of claim 23, wherein the first device and the second device have cam surfaces which are followed by the at least one cam following means as the moving means moves from the first device to the second device.

25. The apparatus of claim 21, wherein the guidance means includes at least one telescopic guide rail.

26. The apparatus of claim 21, wherein the guidance means includes at least one master guide rail and at least one slave guide rail, wherein the slave guide rail is capable of sliding within the master guide rail.

27. The apparatus of claim 21, wherein the guidance means is coupled to the first device by a hinged coupling and is coupled to the second device by a ball joint coupling.

28. The apparatus of claim 21, wherein the guidance means is coupled to at least one of the first device and the second device by a hinged coupling.

29. The apparatus of claim 21, wherein the guidance means is coupled to at least one of the first device and the second device by a ball joint coupling.

30. The apparatus of claim 21, wherein the first device and the second device are capable of being positioned at an angle to one another.

31. The apparatus of claim 21, wherein the first device and the second device are capable of being positioned at different heights relative to one another.

32. The apparatus of claim 21, wherein the first device and the second device are capable of being positioned at different distances from one another.

33. A tape cartridge transport system, comprising:
   a first library storage module;
   a second library storage module; and
   a tape cartridge pass-through port, wherein the tape cartridge pass-through port is adjustably coupled to the first library storage module and second library storage module such that the first library storage module and the second library storage module are capable of being positioned at various positions relative to one another while remaining capable of transporting a tape cartridge between the first library storage module and the second library storage module via the tape cartridge pass-through port, wherein the first library storage module and the second library storage module are capable of at least one of being positioned at an angle to one another, being positioned at different heights relative to one another, and being positioned at different distances from one another.

34. A pass-through port apparatus for passing storage media from a first library storage module to a second library storage module, comprising:
   a first library storage module terminal port, wherein the first library storage module terminal port is configured for connection to the first library storage module;
   a second library storage module terminal port, wherein the second library storage module terminal port is configured for connection to the second library storage module;
   a guide rail assembly having a first end and a second end, wherein the first end is coupled to the first library storage module terminal port, the second end is coupled to the second library storage module terminal port, and wherein the first end is moveably coupled to allow for different angles in connection of the second library storage module terminal port to the second library storage module; and
   a carrier connected to the guide rail assembly, wherein the carrier is adapted to receive the storage media and transport the storage media between the first library storage module terminal port and the second library storage module terminal port along the guide rail assembly.

35. The pass-through port apparatus of claim 34, wherein the second end is moveably coupled to allow for different angles in connection of the second library storage module terminal port to the second library storage module.

36. The pass-through port apparatus of claim 34, wherein the storage media include one of tape cartridges, digital versatile disks, floppy disks, magnetic tape reels, ROM or RAM cartridges, ZIP disks, and removable hard drives.

* * * * *